United States Patent [19]

Campo

[11] Patent Number: 5,060,561
[45] Date of Patent: Oct. 29, 1991

[54] MACHINE FOR SHAPING AND COOKING FOODSTUFFS

[76] Inventor: Luis B. Campo, Desengaño #94, Huesca, Spain

[21] Appl. No.: 302,408

[22] Filed: Jan. 26, 1989

[51] Int. Cl.[5] .......................... A23L 1/32; A47J 37/06
[52] U.S. Cl. ........................................ 99/353; 99/424
[58] Field of Search ............ 99/353, 373, 427, 443 C, 99/423, 424, 352, 386, 402, 396, 325; 426/515, 523; 425/233, 348.5, 439, 442; 198/403, 402, 410, 378

[56] References Cited

U.S. PATENT DOCUMENTS

| 316,741 | 4/1885 | Carpenter | 99/424 |
|---|---|---|---|
| 1,869,539 | 8/1932 | Brand | 99/423 |
| 2,207,264 | 7/1940 | Neuberger | 99/373 |
| 2,352,447 | 6/1944 | Powers et al. | 99/386 |
| 2,899,914 | 8/1959 | Van Arsdell | |
| 3,019,744 | 2/1962 | Carvel | 99/402 |
| 3,215,062 | 11/1965 | Frankenberg | 99/353 |
| 3,356,044 | 12/1967 | Keathley et al. | 425/439 X |
| 3,714,888 | 2/1973 | Tanguy et al. | 99/423 X |
| 3,718,487 | 2/1973 | Brunner | 99/353 |
| 3,753,737 | 8/1973 | Latham et al. | |
| 4,653,391 | 3/1987 | Shimizu | 99/424 X |

FOREIGN PATENT DOCUMENTS 2158218 6/1973 France .
7304212 9/1974 Netherlands .

Primary Examiner—Harvey C. Hornsby
Assistant Examiner—Scott J. Haugland
Attorney, Agent, or Firm—St. Onge Steward Johnston & Reens

[57] ABSTRACT

A machine for shaping and cooking food products, especially products made with two or more or components, such as potato omelets. The machine includes a series of containers (2) for shaping and cooking the products, which are distributed in two symmetric parallel rows; means for dragging the containers (10, 11, 12 and 13) throughout both rows, tipping means of the containers (19, 20, 21, 22, 23 and 24), from their rest position to an inverted position over the opposite container and vice versa, control means for starting and stopping the drag means and for activating and deactivating the tipping means; and heating means (16) for the container; only one container of each pair of symmetric containers holding the mixture to be shaped and cooked.

7 Claims, 4 Drawing Sheets

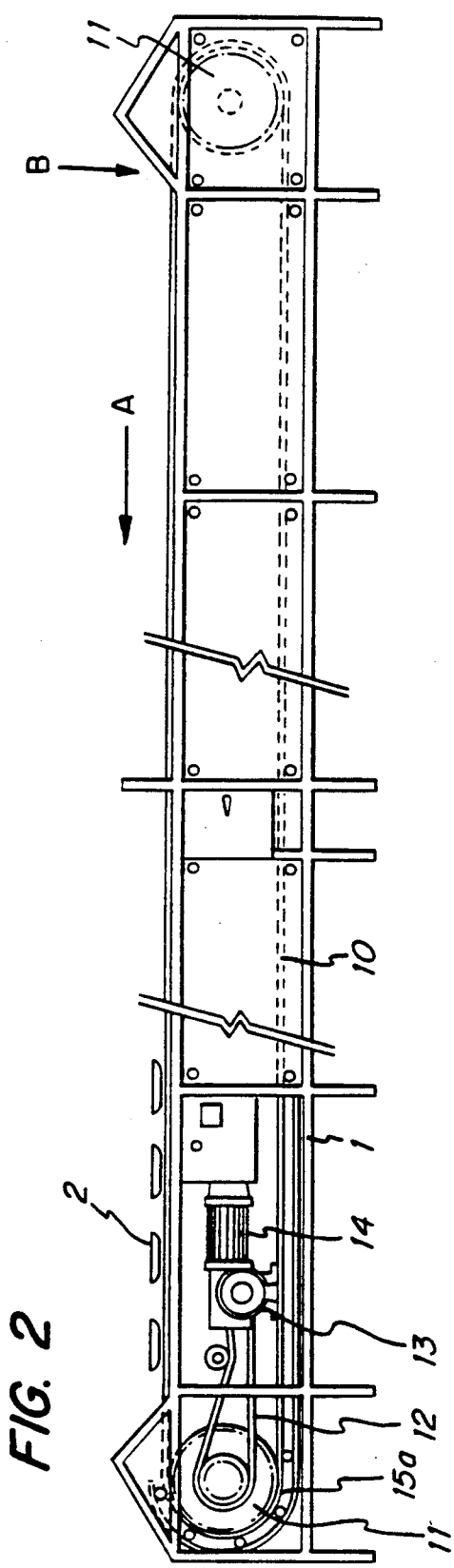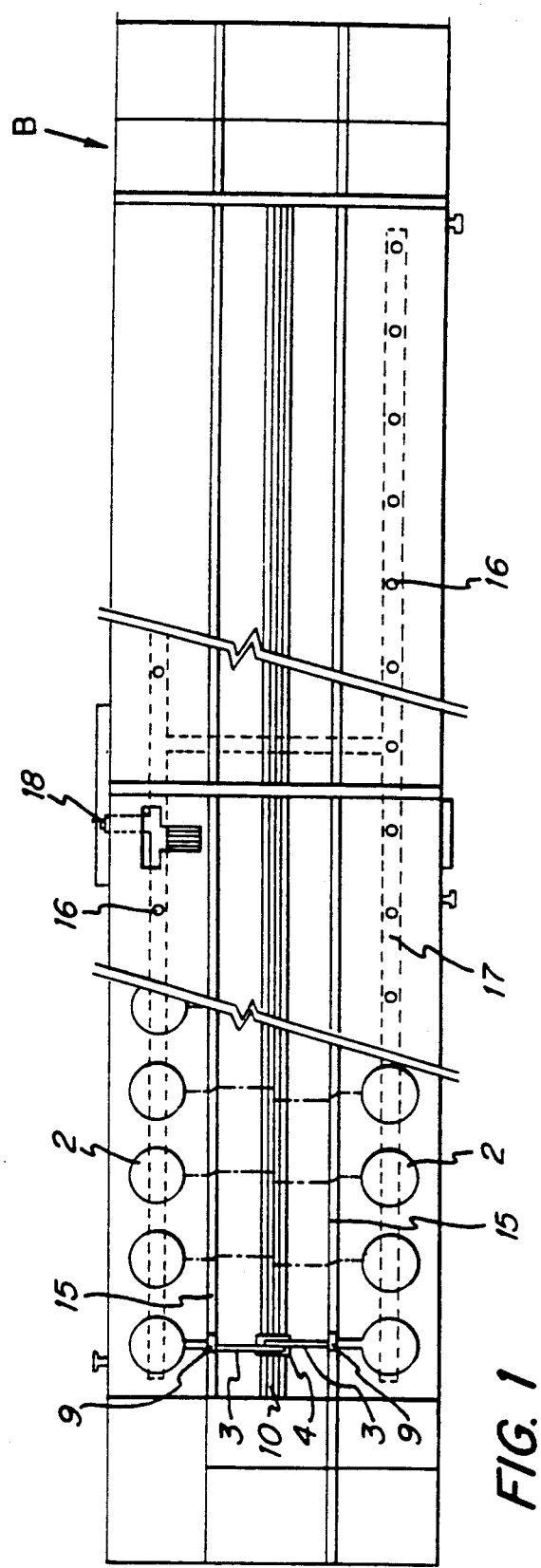

FIG. 3
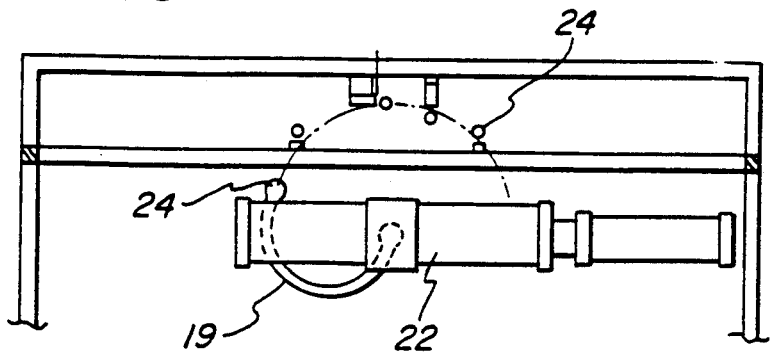
FIG. 4
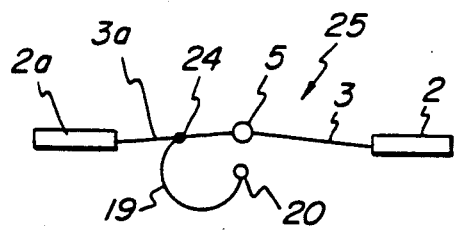
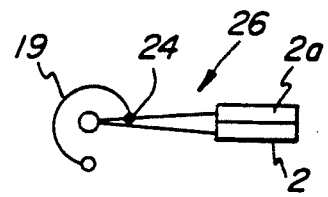
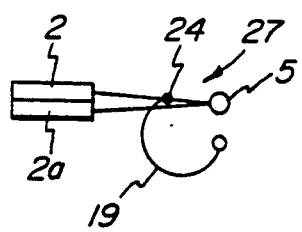
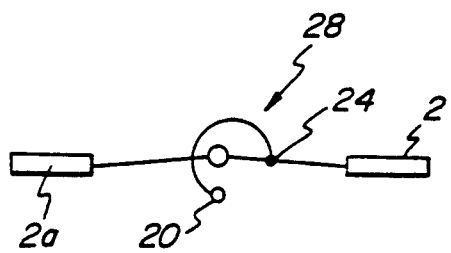
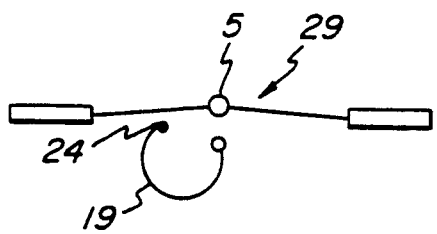

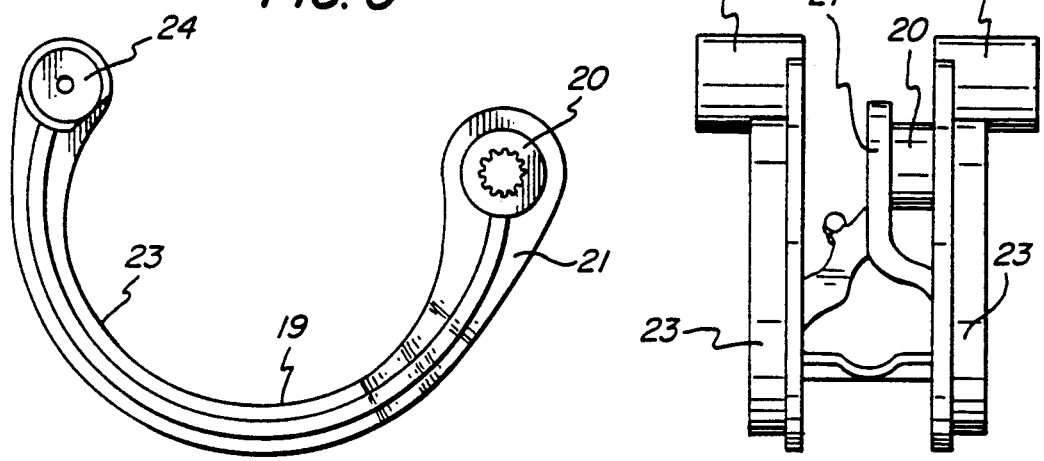
FIG. 5
FIG. 6
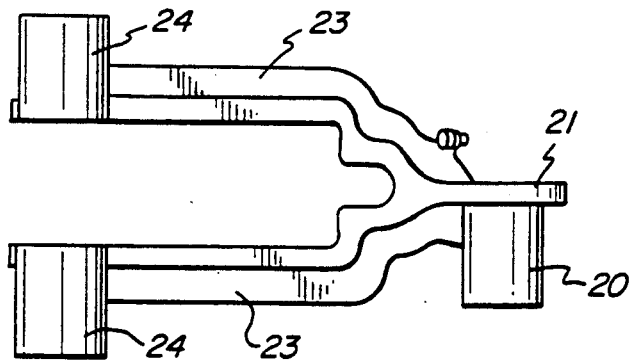
FIG. 7

MACHINE FOR SHAPING AND COOKING FOODSTUFFS

This invention concerns a machine for making and cooking food products, and more specifically food products comprising a mixture of two or more components, which mixture must be shaped to obtain a given configuration, at the same time as the said mixture is cooked, to combine the different components.

More particularly, although not exclusively, the machine in the invention enables the shaping and cooking of omelets of the so-called "Spanish" type, which comprise portions of a reduced thickness of fried potatoes and beaten egg.

The shaping and cooking of this type of omelet takes place in frying pans, it being necessary to toss the mixture, to achieve a good shape and, especially, so that all the egg sets and is partially or completely fried, combining the potatoes.

With the traditional process, the omelets have to be formed one by one, which prevents them being made on an industrial scale, due to the high amount of labour which would be required.

The purpose of this invention is to develop a machine which enables omelets of the type described to be made quickly without practically any labour in the shaping and cooking operations, the manufacturing process thus being industrialisable.

The machine in the invention is designed to shape and cook omelets, starting from the mixture formed by the previously fried potatoes and beaten eggs.

In accordance with the invention, the machine includes a series of containers, preferably in the form of frying pans, intended to shape and cook the products. These containers are distributed in two symmetric parallel rows, the containers in both rows being transversally aligned in pairs. Furthermore, the containers move the length of the said rows, for which the machine has dragging means for these containers throughout the length of the rows, the containers on both sides always being symmetric, thus ensuring transversal alignment in pairs.

The machine also includes means for tipping the containers by displacing them from their normal position to an inverted position on the opposite container and vice versa. The containers describe a circular path around a central shaft which is parallel and equidistant to both rows of containers.

The machine is also equipped with control means for starting and stopping the drag means of the containers, and also for activating and disactivating the tipping means.

To each pair of transversally aligned containers, one in each row, only one holds the mixture to be shaped and cooked.

To shape the omelets, the mixture of fried potatoes and beaten eggs is placed successively in the containers in one row, which move over heating means which shape and cook the product. When the containers reach a certain point, the tipping means start to operate through which the mixture being shaped is transferred to the opposite frying pan or container, belonging to the other row. From this point, the containers in the second row are the ones which transport the mixture and run along the heating means, while the containers in the first row pass empty.

The drag means of the containers comprise a continuous chain mounted between cogwheels for dragging and changing direction. This chain, at least in the forward stretch, runs horizontally. Equidistant supports are fixed to the said chain, to each of which, according to a shaft situated in the plane of symmetry of the two rows of containers, two arms are hinged, in a perpendicular direction to the said plane of symmetry, one on either side of the chain. These arms are coplanar, at least in their end portion, and have two containers fixed at their free end.

To assist the movement of the containers on either side of the chain, two tracks are provided parallel to the said chain, in which the holder arms of the containers rest, through skids or bearings mounted on these arms.

The tipping means of the containers comprise a moving arched fork which runs below the drag chain in a point of its path, in the transversal direction of the said chain. The fork is fixed by the end of its central branch to a shaft parallel to the rotating axis of the arms. This shaft is driven by a pinion and rack device, through a pneumatic or hydraulic dualeffect cylinder.

On activating the cylinder in one direction or another, the fork mentioned can move according to a circular path described around the shaft to which it is fixed. The displacement of the fork occurs between two limit positions, one which we shall call retraction, in which the fork is placed under the chain, with the end of the side branches placed at the height of the arms of the containers on one of the sides, and the other which we shall call end or tipping, in which the fork is partially placed above the chain, with the end of the side branches placed at the height of the arms of the containers on the other side.

The fork also has two pneumatic or hydraulic cylinders mounted in the end of its side branches, which face and are perpendicular to the arms of the containers, in the aforementioned limit positions of the fork, to housings existing in the said arms, into which the pistons of the cylinders fit, in their extracted position.

The control means of the machine in the invention include a first microswitch, placed so that on being operated, it stops the drag chain, two of the transversally aligned arms being placed above the tipping means. This microswitch stops the drive motor of the chain, which is connected to the drive plate, at the same time as it activates an electrobrake linked to the said motor, to make the chain stop instantaneously. This first microswitch activates an electrovalve, through a timer; this electrovalve drives one of the cylinders mounted in the ends of the arms of the fork, precisely the cylinder which is opposite the housing of the arm whose container or frying pan is empty at that moment. This microswitch also makes the cylinder which drives the fork move in one direction. In this situation, the piston of the activated cylinder of the fork arm goes into the housing of the respective arm. Then, when the cylinder which controls the fork is operated, it makes the latter turn 180°, dragging the arm and the empty container, which is placed in an inverted position over the opposite container which carries the product to be shaped. When the displaced arm reaches its maximum outer tipping position, it acts on a second microswitch, which activates the second cylinder of the fork arm, its piston entering the housing of the arm holding the frying pan which carries the product. At the same time, the cylinder which drives the fork is fed in the opposite direction. In these conditions, the piston of the second cylinder will go into the housing of the arm which carries the frying pan with the product to be cooked and then makes the fork return, thereby shifting the two arms, with the containers side by side, until the original starting position.

When the two frying pans together turn 180°, the arm of the second frying pan, which is now in an inverted position, acts on a third microswitch which withdraws the cylinder piston of the fork arms first operated; at the same time, the cylinder is again activated which drives the fork to return the second frying pan to its original position, which returns empty after transferring the product contained in the first frying pan. When the arm of this second frying pan reaches its initial rest position, it acts on a fourth microswitch which brings back the respective cylinder of the fork branch, at the same time as it inverts the action of the cylinder which drives this fork, returning it to its original rest position, and leaving the second frying pan in its normal position. When the fork returns to this withdrawn position, a last microswitch is operated which starts the chain working again, which moves forward until the two arms and following containers aligned transversally remain on the tipping means again.

The heating means will be located under the rows of containers, at least in the areas which these transport the products to be cooked.

Each of the aforementioned arms can hold two frying pans in their free ends, thereby duplicating the production of the machine.

The set-up and working of the machine in the invention will be understood better with the following description, made with reference to the attached drawings, in which a possible form of embodiment is shown diagrammatically, by way of unlimiting example.

In the drawings:

FIG. 1 is a partial plan view of the machine constructed in accordance with the invention.

FIG. 2 is a side elevation of the machine in FIG. 1.

FIG. 3 is a diagrammatic cross-section of the machine in FIG. 1, showing the tipping means of the containers.

FIG. 4 shows diagrammatically the different positions of the containers and their carrier arms.

FIGS. 5, 6 and 7 are, respectively, a side elevation, front elevation and plan view of the fork which constitutes the tipping means.

Figure 8:
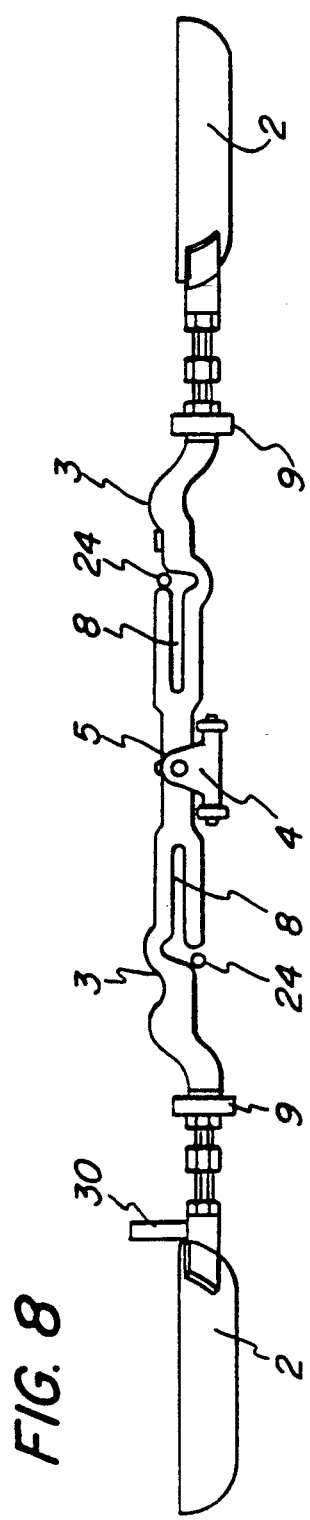
FIGS. 8 and 9 are a side elevation and plan view of two of the transversally aligned containers with their carrier arms and central support to which these arms are hinged.

The machine illustrated in the drawings, as can be seen in FIGS. 1 and 2, comprises a structure or frame 1, over which a series of containers or frying pans 2 are placed, distributed in two parallel symmetric rows, so that the containers of both rows are transversally aligned in pairs.

The containers 2 are fixed at the end of arms 3 which are aligned at least in their end portion.

Figure 9:
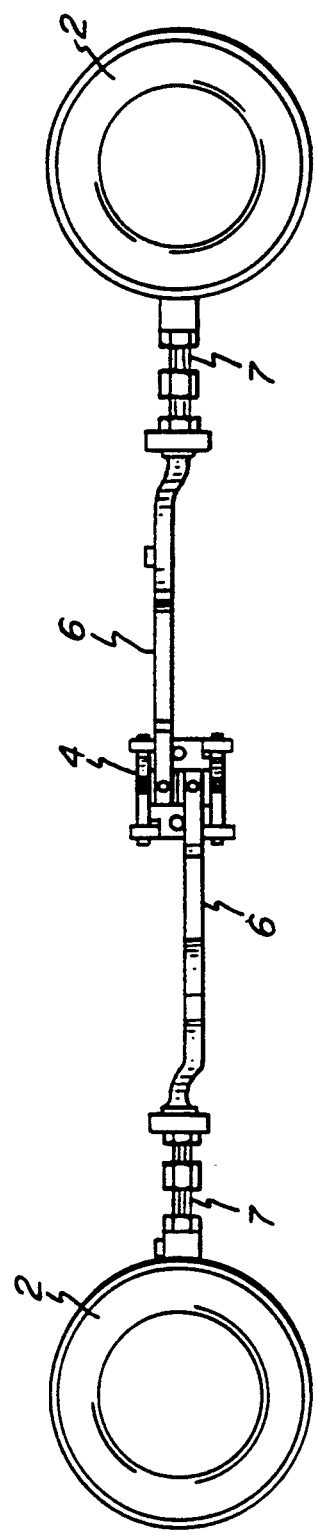

As can be seen in FIGS. 8 and 9, the arms 3 of each pair of transversally aligned containers are hinged at their end adjacent to a central support 4, through a shaft 5 placed in the plane of symmetry of the rows of containers. In the form of embodiment illustrated in the drawings, the arms 3 have a stretch 6 adjacent to the support 4, which is out of line with the end portions 7 of the said arms.

The arms 3 also have two longitudinal grooves 8 passing through both sides and leading to the outside, at the bottom in the arms of one of the sides and at the top in the opposite arm.

Finally, the arms 3 have bearings 9 mounted for resting on the structure or frame 1.

The two rows of containers 2 move along them, for example in the direction of arrow A in FIG. 2, always maintaining the transversal alignment by pairs of containers. This displacement is achieved through a drag chain 10 which is mounted between plates 11, one of which is connected through a transmission 12, to an electric drive motor 13, to which an electrobrake 14 is linked.

Each pair of arms 3 is fixed to the chain 10 through the central support 4. Furthermore, the arms 3 rest through the bearings 9 in longitudinal tracks 15 which run on both sides of the chain 10. These tracks are provided throughout the length of the forward stretch of the chain. In the change of direction areas and in the return stretch of the chain, the tracks have bearings 9 on the outside, as seen in FIG. 2, where these portions of track are indicated with reference 15a.

Under the rows of containers 2, burners 16 are placed for gaseous fuels which are supplied through pipes 17, provided with a gas inlet 18.

In area B which corresponds to the start of the forward stretch of the chain, the product to be cooked is poured into the containers 2 of one of the rows, reaching a point in which, once the motor 13 has stopped, and with the advance of the chain 10, the opposite empty container, together with its arm 3, turns round the hinge pin 5 to the support 4, the empty container remaining in an inverted position over the full container. The two perposed containers then turn in the opposite direction, until they occupy the position of the container which was displaced, originally empty and which will receive the product to be cooked. The upper container then returns to its original position and continues its journey, now empty. In this way, the containers of one of the rows move with the containers of one of the rows move with the product to be cooked from the start of the installation to a point where the said product is transferred to the containers on the other side.

To achieve this transfer effect of the product to be cooked, the machine is provided with tipping means, which comprise a fork 19 which is arranged in a transversal direction in the frame 1; under the advance stretch of the chain 10, this fork is placed towards the central part of the frame 1.

The fork 19 is fixed, through the end 20 of the central branch 21 of the fork, through a toothed hole, in a grooved shaft which is driven through a rack, by means of the pneumatic cylinder 22, housed in the frame 1 between the advance and return stretches of the chain 10. The cylinder 22 is dual-effect and on being activated in either direction causes the displacement of the arm 19, which describes a circular path, between two limit positions, one of retraction, illustrated in FIG. 3, in which the fork is placed under the advance stretch of the chain, and the other outer tipping stretch, in which it protrudes partially above the said chain.

Returning to FIGS. 5 to 7, the side branches 23 of the fork have two pneumatic cylinders 24 mounted in their ends, whose piston can move in a parallel direction to the shaft in which the fork is mounted.

With the layout disclosed, the cylinders 24 mounted in the end of the side branches 23 of the fork, when the latter is in its withdrawn position, illustrated in FIG. 3, are placed slightly under the arms 3, opposite the lower opening of the groove 8, while on activating the cylinder 22 causing the displacement of the fork 19, the cylinders 24 face the upper opening of the groove 8 of the opposite arm, as shown in FIG. 8. On activating one of the cylinders 24, in the withdrawn position of the fork 19, its piston goes through the lower opening of the groove 8, to continue later the whole length of the said groove, when the fork is displaced. On reaching the maximum displacement, when the other piston 24 faces the upper opening of the groove 8 of the opposite arm, on removing the piston, this goes into the groove 8, throughout which it moves, on inverting the displacement of the fork 19 to return to its original withdrawn position.

The way the machine works is explained below, with reference to FIG. 4.

In the diagram shown in FIG. 4, the containers in one row holding the product to be cooked are marked with number 2, while the containers marked with number 2a are empty. Each time a pair of containers 2-2a passes above the tipping means, defined by the fork 19, the drag chain stops, by the action of a microswitch which activates an electrovalve at the same time, through a timer, which operates an electrovalve which operates one of the cylinders 24 mounted in the end of the side branches of the fork 19. At the same time, the cylinder 22 is activated, in charge of driving the fork 19. With these actions, when the piston emerges from the respective cylinder 24, it goes through the lower opening of the groove 8 of arm 3a; this arm and the empty container 2a are displaced until they reach the position marked with reference number 26, in which the container 2a is superposed, in an inverted position, over container 2. At this moment, a second microswitch works which activates the other cylinder 24, making the respective cylinder leave and which goes in through the upper opening of the groove 8 of the arm 3. At the same time, the cylinder 22 is activated in the opposite direction, whereby the fork 19 returns to the withdrawn position shown in FIG. 4 and marked with reference number 27. From position 26 to 27 both containers 2-2a return to the original position of container 2a, whereby the product contained in vessel 2 passes to container 2a. On reaching this position, marked with reference number 27, a third micro operates, which disactivates the first cylinder 24 in position 25 and again activates cylinder 22, the fork then passes again from its withdrawn position to its extraction or tipping position, marked with reference number 28. When container 2 returns to its original position, it does so empty, the product remaining in container 2a. In the position marked with reference number 28, a fourth micro is operated which causes the retraction of the second cylinder 24, and also the actuation of cylinder 22 in the opposite direction, which returns fork 19 to its original position, as shown with reference 29. When the fork 19 reaches this maximum withdrawal position, it acts on a last micro which again starts the motor 14 and the drag chain 10 working, until a new pair of containers is placed on the tipping device defined by the fork 19.

Consequently, from the beginning of the installation to the area where the tipping means are placed, it will be the containers in one row which carry the product to be cooked, while from the said means, the product will be placed in the containers in the other row.

The burners 16 will be placed throughout the length of the areas in which the vessels containing the product to be cooked run. These burners can also be placed under the empty containers, in a stretch located immediately below the tipping means, from which they will receive the product to be cooked, in order to preheat them.

To ensure the position of the chain 10, upper and lower guides can be provided, which prevent them accidentally coming out or being displaced.

The products to be cooked can be arranged from the start of the installation, in alternating containers, one in each row; tipping can also then be arranged alternatingly, from both rows.

The micros which control the different movements can be replaced by limit sensors of the cylinders.

As can be seen in FIGS. 8 and 9, the end stretch 7 of the arms 3 holding the containers, are adjustable in length, in order to obtain the exact position of the containers 2.

As can also be seen in FIG. 8, the containers of one of the rows can have a prong 30, through which the correct superposed and opposing position of the containers 2 is ensured, illustrated in FIG. 4 with reference numbers 26 and 27.

Also, understandably, the chain 10 and the rows of containers 2, could describe a different circle. For example, both the drag chain and the containers could describe a circular path.

After sufficiently disclosing the nature of the invention, together with the way of executing it in practice, it should be stated that the foregoing layout, illustrated in the attached drawings, are liable to modification in detail, provided they do not alter its basic principle.

I claim:

1. A machine for shaping and cooking foodstuffs comprising:
    a) a series of containers distributed in two symmetric parallel rows, wherein said rows of containers are transversely aligned in pairs and said containers move along said rows;
    b) drag means for said containers comprising an endless chain having fixed therein equidistant supports;
    c) a series of pairs of arms, each of the arms in each pair of arms having an end hingeably connected to one of said equidistant supports and a free end which supports one of said containers, wherein said arms are positioned on said equidistant supports in a manner effective to maintain the symmetry and transverse alignment of said containers along the length of said rows;
    d) a moving arched fork having a central branch and two side branches, wherein said fork runs under said chain, in a point of its path, in a transverse direction;
    e) a shaft parallel to and equidistant from said rows of containers and parallel to the rotational axis of said arms, having said fork fixed thereto by its central branch;
    f) tipping means which causes said fork to shift in a circular path about said shaft between two limit positions:
        i) a first limit position in which said fork is placed under said chain with its side branches placed slightly under said arms on one of said rows, and
        ii) a second limit position in which said fork is partially placed over said chain with its side branches placed at the height of said arms on the other of said rows, wherein said tipping means displaces said containers from a rest portion to an inverted position over the opposite container, and from the inverted position back to the rest position;

g) control means for starting and stopping said drag means and said tipping means; and h) heating means for heating at least one of said containers.

2. A machine according to claim 1, wherein the drag means comprise an endless chain and cogwheels, wherein said endless chain is mounted between said cogwheels for dragging and changing direction, said chain running at least in a forward stretch, in a horizontal plane.

3. A machine according to claim 1, wherein said drag chain is located in the plane of symmetry of the two rows of containers.

4. A machine according to claims 1, 2, or 3, further comprising two tracks which run on both sides of said chain, parallel to said chain, in which said arms carrying said containers rest through bearings mounted in said arms.

5. A machine according to claim 1, which further comprises a rack and a first cylinder having a piston which can be extended or retracted, wherein said shaft is driven through said rack by means of said first cylinder.

6. A machine according to claim 5 further comprising a cylinder, having a piston which can be extended or retracted, mounted at the end of each of the side branches of said fork, said cylinders being mounted so as to be perpendicular to said arms when in one of said limit positions, wherein said arms comprise a housing into which said pistons can extend.

7. A machine according to claim 6 wherein said housings of said arms carrying the containers consist of longitudinal grooves, one in each arm, said grooves passing through side surfaces of said arms.

* * * * *

UNITED STATES PATENT AND TRADEMARK OFFICE
CERTIFICATE OF CORRECTION

PATENT NO. : 5,060,561

DATED : October 29, 1991

INVENTOR(S) : Luis B. Campo

It is certified that error appears in the above—identified patent and that said Letters Patent is hereby corrected as shown below:

Col. 1, line 55, "To" should read --Of--.

Signed and Sealed this

Twenty-third Day of February, 1993

*Attest:*

STEPHEN G. KUNIN

*Attesting Officer*     *Acting Commissioner of Patents and Trademarks*